United States Patent [19]

Nausedas

[11] 4,044,425
[45] Aug. 30, 1977

[54] PRODUCT STUFFING APPARATUS AND METHOD

[75] Inventor: Joseph Anthony Nausedas, Chicago, Ill.

[73] Assignee: Union Carbide Corporation, New York, N.Y.

[21] Appl. No.: 724,255

[22] Filed: Sept. 17, 1976

[51] Int. Cl.² .......................... A22C 11/02; B65B 1/24
[52] U.S. Cl. .......................................... 17/35; 53/24; 53/122; 53/124 E
[58] Field of Search ....................... 53/24, 122, 124 E; 17/33, 35, 38, 39, 41, 42

[56] References Cited

U.S. PATENT DOCUMENTS

| | | | |
|---|---|---|---|
| 3,890,675 | 6/1975 | Nausedas | 17/41 |
| 3,919,739 | 11/1975 | Kawai | 17/33 |

*Primary Examiner*—Travis S. McGehee
*Attorney, Agent, or Firm*—Cornelius F. O'Brien

[57] ABSTRACT

Apparatus and method for stuffing viscous product into a shirred casing to produce stuffed casings having product-free end closures. The stuffing apparatus comprises a stuffing horn having disposed interiorly therein a product stoppering means axially translatable between a first site away from the discharge opening in the stuffing tube and a second site blocking the discharge opening in the stuffing tube, said product stoppering means comprising a plunger adapted to seat within and project sufficiently outward from the discharge opening of the stuffing horn so as to effectively sever and compact a product in the trailing end of a stuffed casing thereby effectively providing the trailing end of the stuffed casing adjacent the product with a product-free closure zone.

14 Claims, 9 Drawing Figures

PRODUCT STUFFING APPARATUS AND METHOD

FIELD OF THE INVENTION

The invention relates to an apparatus and method for stuffing a flowable product, such as food emulsion, into a shirred casing so as to produce a stuffed casing having aft and fore closed ends free of product strand entrapment.

BACKGROUND OF THE INVENTION

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing the deshirred casing with viscous meat emulsion fed under pressure through the stuffing horn and into the casing interior. As used herein, the term "casing" or "tubular casing" is intended to mean tubing of natural or manufactured materials, and the term "casing length" is intended to mean continuous tubular casing lengths. Shirred tubular casings are also known to persons familiar with the art as "sticks", such "sticks" being long lengths of casing having a substantially large bore, which have been shirred and compressed into short compact self-sustaining lengths, or which may be a package of shirred and compressed casing sheathed inside a retaining sleeve, or mounted on a semirigid retaining tube. Using suitable food stuffing machinery, casing lengths can be stuffed and formed into unit size packages of particulate viscous materials, such as ground or chopped fresh meats, or the like. It is to be understood that the invention is not limited to such stuffed products, but is equally advantageous for the encasing of stuffed products of viscous material, such as fats, cheese, ice cream, scrapple, meat products, as well as lard, oleomargarine, grease and other products normally stuffed into casings.

The materials from which the casing lengths discussed herein are manufactured are typically thin-walled, flexible thermoplastic films prepared from polyethylene and other polyolefins, polyvinylidene chloride, polyvinyl chloride, polyesters and the like, or they may be prepared from unsupported or fibrous reinforced cellulose, or any other suitable material. Apparatus and processes are well known in the food casing art for shirring tubular cellulosic food casing, such as, for example, disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater.

In the art of producing sausages and similar food products, finely divided meat compositions commonly referred to as emulsions are conventionally stuffed into tubular material of long length which, as stated above, may be of natural or manufactured materials. The stuffed tubing is then tied, twisted or clipped into predetermined unit length packages. For many years, the apparatus and methods employed to prepare the encased food products and particularly food products encased in large diameter casings have relied upon manual manipulation in controlling the stuffing of food emulsion into predetermined length sausage links or packages. Recently advances in the art have resulted in the introduction of apparatus for machine control of the stuffing operation which have provided means for preparing uniformly sized encased food products as, for example, disclosed in U.S. Pat. Nos. 2,871,508, 2,999,270, 3,264,679, 3,317,950, 3,454,980, 3,457,588, 3,553,769, 3,621,513, 3,659,317 and 3,751,764.

Of the most recent advances in the art, several satisfactory methods and apparatus are available for sausage production in the smaller diameter and length sizes, frankfurters particularly, and also for the production of stuffed casing in the larger diameter and length sizes, such as bologna, salami, liverwurst and the like products.

Although many of the prior art stuffing apparatus can generally provide an overall fairly good stuffed article, one problem generally encountered in many of the apparatus is that after the product flow is stopped and the stuffed casing is advanced to a clip closing station, strands of the product, such as meat strands, can drag along the inside of the casing and become entrapped within the clip-closure zone. In the stuffing of meat emulsion, the entrapped meat strands within the clip closure zone can cause a non-liquid type closure, bacterial spoilage of the meat emulsion, and, in addition, provide an unsightly commercially unacceptable stuffed article.

It is, therefore, an object of the present invention to provide an apparatus for stuffing a shirred or unshirred casing so as to produce a stuffed casing having product-free closure zones.

Another object of this invention is to provide a stuffing apparatus with a product stoppering means which is capable of stopping product flow into a casing and then severing and compacting the product at the trailing end of the casing so as to provide an effective product-free closure zone at the trailing end of the stuffed casing adjacent the stuffed product.

Another object of this invention is to provide a method for producing a stuffed product casing having product-free closure zones.

These and other advantages and features of the present invention will become apparent from the ensuing description and from the accompanying drawing.

SUMMARY OF THE INVENTION

The invention broadly relates to an apparatus for stuffing flowable viscous product into a shirred or unshirred casing which comprises:

a. a stuffing horn having an inlet end for receiving flowable viscous product from a pressurized product supply and a discharge end for discharging the product, said stuffing horn being adaptable for concentrically receiving a shirred or unshirred casing;

b. constraining means positioned about said stuffing horn for maintaining tension on the casing as it is being stuffed with a pressurized flowable viscous product; and c. product stoppering means disposed interiorly of the stuffing horn and adapted to cooperate with the stuffing horn so as to be effectively reciprocated between a first site where the stoppering means is disposed within the stuffing horn and in which a product stuffing flow can proceed through the stuffing horn and out through the discharge end of said horn, and a second site in which the product stuffing flow would be stopped at the discharge end of the stuffing horn by said product stoppering means, said product stoppering means comprising a plunger adapted to seat within and project sufficiently outward from the discharge end of the stuffing horn when said stoppering means is disposed at the second site so as to effectively sever and compact a product in the trailing end of a stuffed casing thereby effectively providing the trailing end of a stuffed casing adjacent the stuffed compacted product with a product-free closure zone.

The stuffed casing could then be tied, twisted or clipped or otherwise closed as desired. When the trailing end is to be clipped, then a closure means could be added to the apparatus as disclosed in U.S. Pat. No. 3,975,795 to Vytautus Kupcikevicius et al, or U.S. Patent Application Ser. No. 627,254 to Raudys et al filed Oct. 30, 1975, or as disclosed in any of the United States patents referred to above, or as disclosed hereinafter.

The plunger comprising the product stoppering means could have any geometric circumferential contour as long as it corresponds to and is capable of mating with and seating snugly within the discharge aperture disposed at the discharge end of the stuffing horn. Preferably, the circumferential contour of the plunger should be such as to provide a tight slide fit with the discharge aperture defined at the discharge end of the stuffing horn so as to insure that the product will be completely severed when the plunger is seated within said discharge aperture of the stuffing horn of the apparatus. Thus the circumferential contour could be any shaped polygon, such as a circle, square, hexagon, etc. The segment of the plunger adapted for projecting beyond the surface defining the discharge aperture of the stuffing horn could be of any geometrical shape as long as it projected sufficiently to compact the product in the trailing end of a stuffed casing so as to provide an effective product-free closure zone adjacent the product at the trailing end of a stuffed casing. Thus the projected configuration of the plunger could be of a conical, hemispherical or truncated shape or any other suitable shape. To insure that the product is sufficiently compacted at the trailing end of a stuffed casing, the plunger should project beyond the surface defining the discharge aperture by a distance of between about 1/24 and about ⅜ the diameter of the stuffing horn. Preferably, the projected distance should be between about 1/12 to ⅛ the diameter of the stuffing horn. A plunger projected-distance less than 1/24 the diameter of the stuffing horn generally would not provide sufficient compactment of the project at the trailing end of a stuffed casing to completely eliminate non-compacted portions of the product at the closure zone while a plunger projected-distance longer than ⅜ the diameter of the stuffing horn would encounter a relatively high resistance in compacting the product at the trailing end of a stuffed casing without gaining any additional benefit in obtaining a better product-free closure zone adjacent the product at said trailing end of the stuffed casing. In addition, if the end of the product is severly compacted by the stoppering means, then the stuffed casing so produced will have aft and fore ends of dissimilar appearance. Generally, for most applications, the plunger should project between about ⅛ inch (0.32 cm) and 2¼ inches (5.72 cm) beyond the surface defining the discharge aperture and preferably between about ¼ inch (0.64 cm) and 1 inch (2.54 cm).

The invention also relates to a method for stuffing a shirred or unshirred casing with product to produce stuffed casings with product-free closure zones which comprises:

a. sheathing a shirred or unshirred casing onto a stuffing horn, said horn having an inlet end and a discharge end, and the fore end of the shirred casing proximal the discharge end of the horn being closed;

b. supplying a pressurized flowable viscous product at the inlet end of the stuffing horn and releasing said product from the discharge end of said stuffing horn to progressively stuff the casing;

c. stopping the flow of pressurized product after a predetermined length of casing has been stuffed;

d. severing and compacting the product at the trailing end of the casing so as to provide a product-free closure zone adjacent said compacted product at said trailing end of said stuffed casing; and e. applying a closure at the aft end of said stuffed casing.

In a method for producing stuffed casings with product-free closure zones on a continuous basis until the shirred or unshirred casing is completely expended, then the following steps would be substituted for step (e) above:

e. applying a closure at the aft end of said stuffed casing and a closure at the fore end of the succeeding trailing unfilled casing;

f. severing said stuffed closed end casing intermediate said aft end closure and said fore end closure of the succeeding trailing unfilled casing; and g. repeating the supplying step (b), the stopping step (c), the severing and compacting step (d), the closure step (e) and the severing step (f) until the shirred or unshirred casing is completely expended.

The apparatus and method of the present invention will become apparent from the following description thereof when considered together with the accompanying drawing which is set forth as being exemplary of the embodiments of the present invention and is not intended, in any way, to be limitative thereof and wherein.

DETAILED DESCRIPTION

Figure 1:
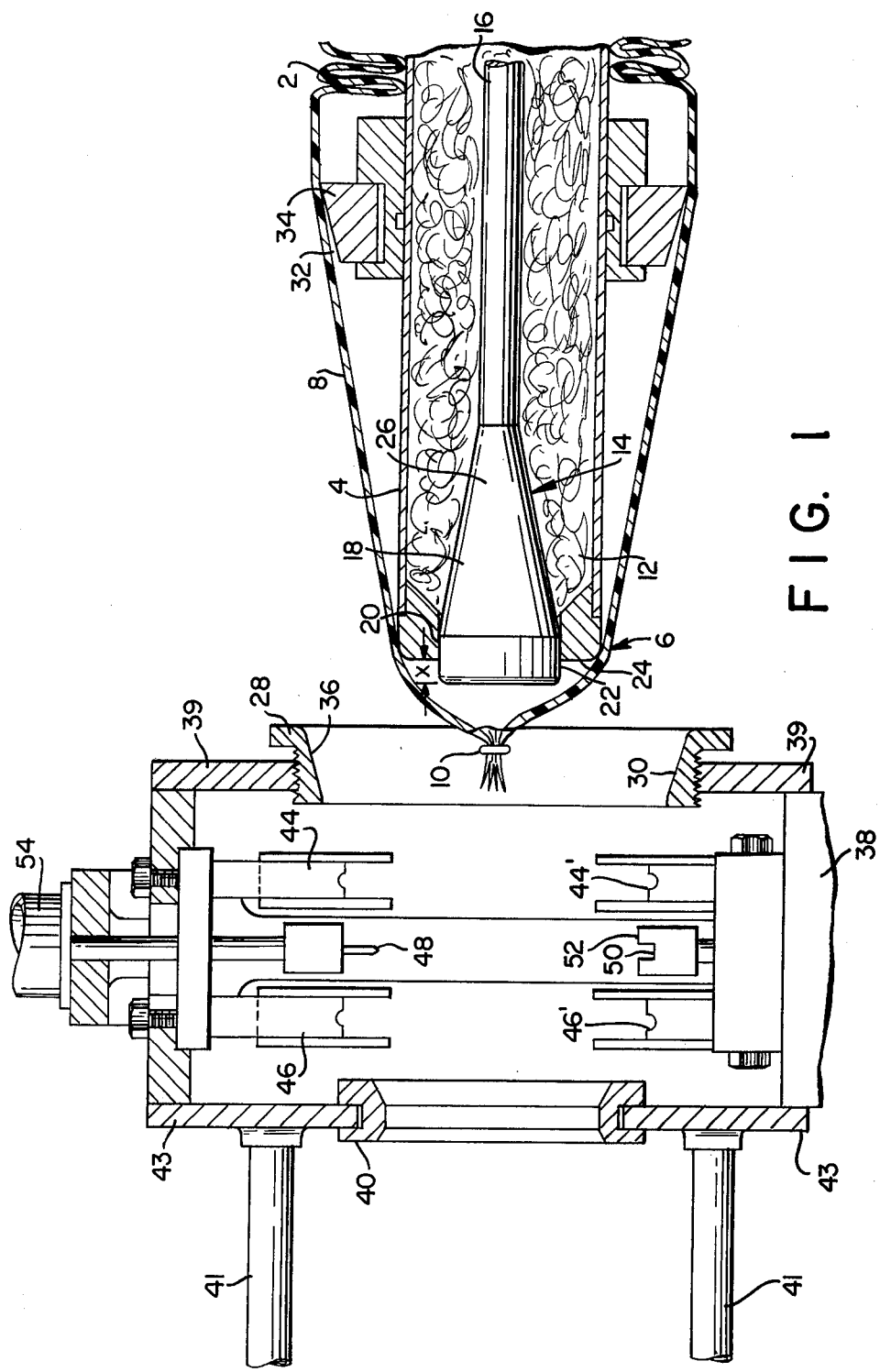
FIG. 1 is a vertical sectional view through an apparatus according to the invention showing a shirred casing on a stuffing horn just prior to its movement into position for receiving a pressurized stuffing product.

With reference to the drawing, a stuffing apparatus according to the present invention is illustrated showing a flexible shirred casing 2 disposed on a stuffing horn 4, the latter of which is coupled to a pressurized food product dispenser not shown. Stuffing horn 4 is formed with a discharge outlet 6 which has an outer peripheral dimension less than the peripheral inner dimension or bore of the shirred casing 2 as shown in FIGS. 1 and 3 to 5 of the drawing. The fore end 8 of the shirred casing 2 is shown deshirred and slipped over the discharge outlet 6 of the stuffing horn 4 and closed thereat by sealing clip 10.

Figure 2:
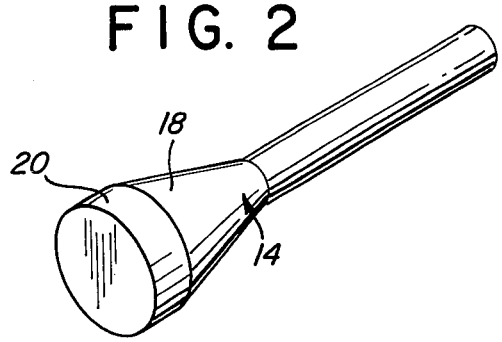
FIG. 2 is a perspective view of the plunger used as the stoppering means in the stuffing apparatus of FIG. 1.
Figure 3:
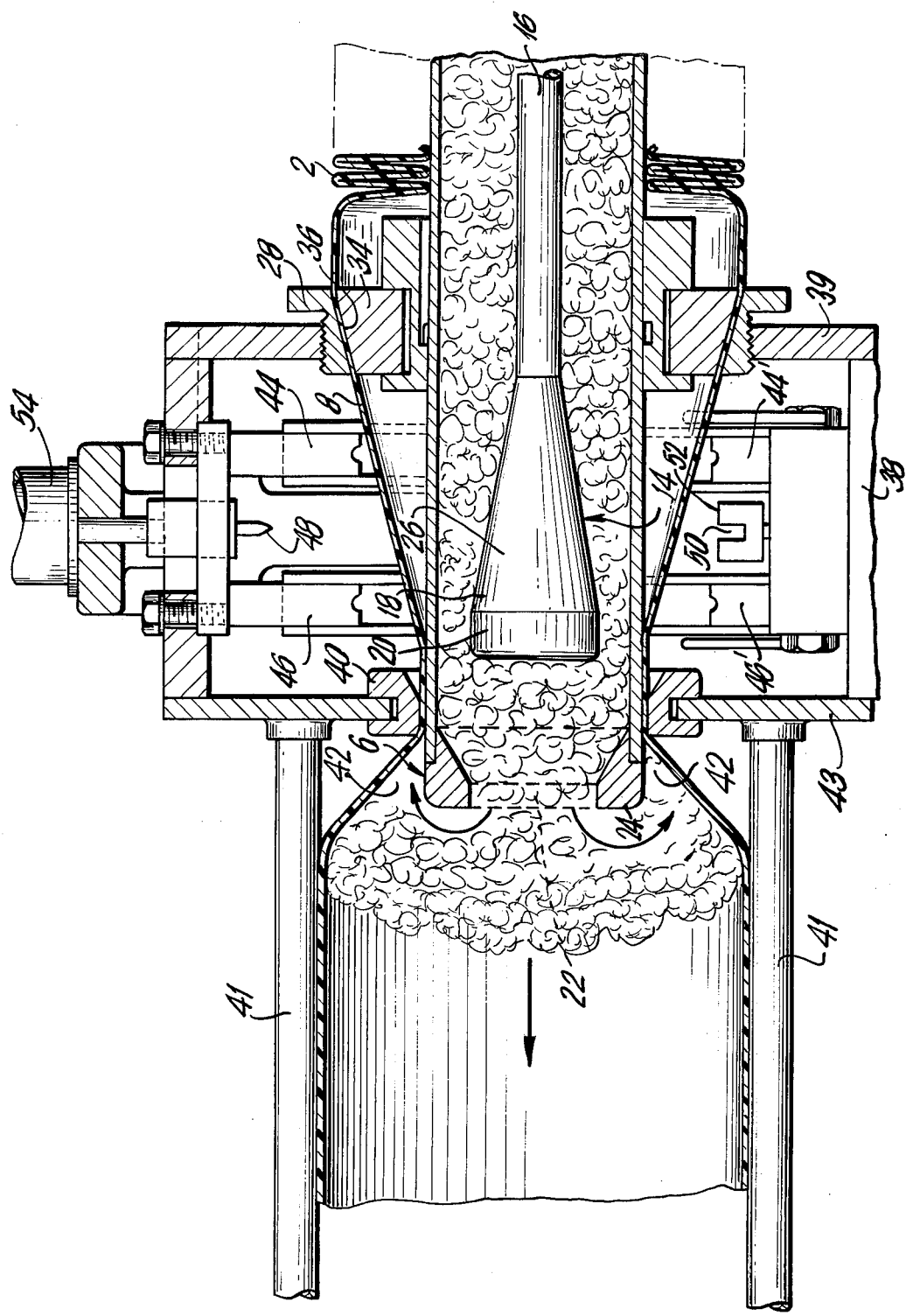
FIG. 3 shows the apparatus of FIG. 1 with the stoppering means axially positioned inboard of the discharge end of the stuffing horn thereby permitting the pressurized product to fill the casing.
Figure 4:
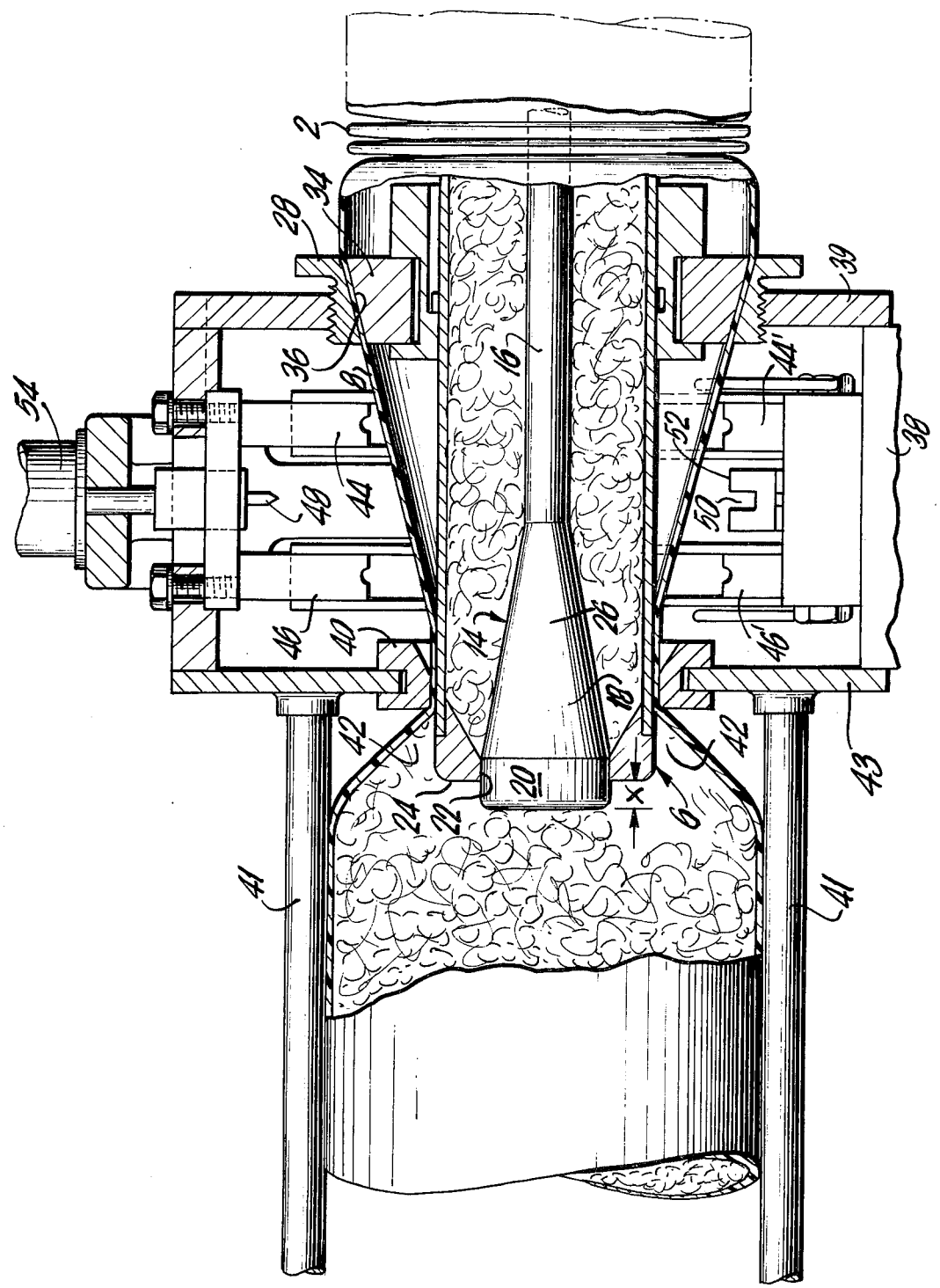
FIG. 4 shows the apparatus of FIG. 1 with the stoppering means of this invention seated within and projecting from the surface defining the discharge end of the stuffing horn thereby stopping the flow of pressurized product into the casing.
Figure 5:
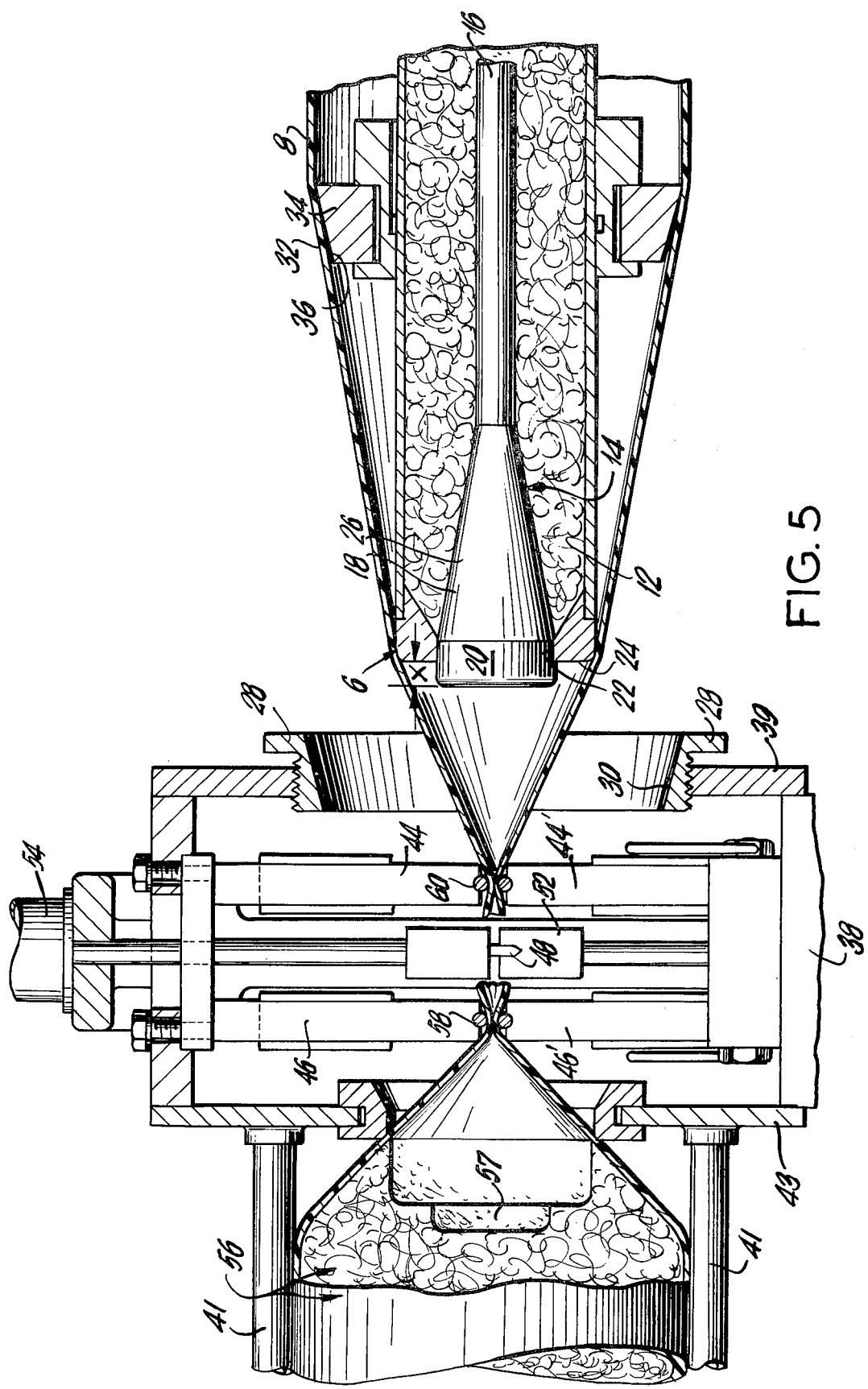
FIG. 5 shows the apparatus of FIG. 1 with the just filled casing advanced forward of the stuffing horn, and closure and severing means effecting a closure and severing, respectively, of the just filled casing.

Within the bore 12 of stuffing horn 4 is mounted a product stoppering device 14. As shown in FIGS. 1 and 2, product stoppering device 14 comprises a centrally positioned connecting rod 16 and plunger 18, said rod 16 being longitudinally movable within the bore 12 by conventional pneumatic cylinder means or the like (not shown). At the fore portion of the plunger 18 a cylindricalshoulder 20 is provided which is adapted to mate with and seat within the discharge opening or aperture 22 at the discharge or outlet end 6 of stuffing horn 4 so that in the completely advanced position shown in FIGS. 1, 4 and 5, the plunger 18 prevents flow of product through stuffing horn 4. As shown in FIGS. 1, 4 and 5, cylindrical shoulder 20 projects beyond the surface 24 defining opening 22 by a distance "X" which preferably should fall within the range specified above with respect to the diameter of the stuffing horn. In the retracted position, as shown in FIG. 3, the outlet 22 is opened and product can be dispensed therefrom. The aft portion 26 of plunger 18 is of streamlined or conical configuration to permit ready flow of the product thereabout.

An annular ring element 28, having a truncated conical shaped interior bore surface 30 to mate with the truncated conical shaped exterior surface 32 of collar 34, is adapted to be disposed concentrically on stuffing horn 4 in mating relationship with collar 34 so as to define a truncated conical passage 36 (FIG. 3) through which casing 2 advances in a controlled friction movement as it is being stuffed. Thus a sufficient amount of tension will be imparted to the casing being stuffing so as to produce a compact stuffed article. Annular ring 28 is secured to carriage assembly 38 via bracket 39, said carriage assembly 38 being arranged and disposed to move reciprocally longitudinally parallel to the axis of stuffing horn 4 via a pneumatic cylinder (not shown) coupled to post 41.

A flowback seal annulus 40 is mounted on the fore end of carriage assembly 38 via bracket 43 and is positioned during the stuffing operation to be adjacent and concentrically around discharge end outlet 6 of stuffing horn 4 so as to loosely urge the casing being stuffed against the outer surface of the stuffing horn 4 snugly enough to prevent product backflow along the outer surface of the stuffing horn 4 as shown in FIG. 3. It has been found that when the flowback seal annulus 40 is flush mounted about the discharge end of the stuffing horn 4, and a meat emulsion containing fat is stuffed into the casing, a streaking and/or smearing of fat could occur against the interior of the casing wall yielding a stuffed casing having an undesirable streaked appearance. More specifically, the fat content of the meat emulsion which is forced through the stuffing horn 4 tends to separate from the meat mass and cling to the interior surface of the tube until a rather thick layer is formed. Some of this fat layer is then fed through the stuffing tube opening 22, and with a laminar discharge flow of the meat emulsion, the fat is brought to the interior of the casing wall during stuffing. To eliminate this streaking problem, this flowback seal annulus 40 is positioned upstream about the stuffing horn 4 as shown in FIG. 3 to create a so-called pocket 42. With the flowback seal annulus 40 arranged in this manner, some of the meat emulsion discharged from the stuffing horn 4 moves into the pocket thereby creating a turbulence in the meat emulsion flow as shown by the arrows in FIG. 3, which effectively redistributes the streaks of fat within the meat emulsion to yield a substantially homogeneous meat emulsion stuffed casing.

Mounted on carriage assembly 38 is a pair of pneumatically operated conventional casing gathering and clip-closing devices, i.e., a leading end clip-closing device 44-44' and a trailing end clip-closing device 46-46'. A pneumatically operated conventional severing knife 48, for severing the clip-closed product, is adapted to be advanced into slot 50 in gathering shoe 52. Movement of severing knife 48 is sequentially timed by means of control elements activating pneumatic cylinder 54 to which the severing knife 48 is connected, said pneumatic cylinder 54 being of the type disclosed in U.S. application Ser. No. 627,254 by V. A. Raudys et al filed Oct. 30, 1975 and made a part hereof by reference.

The operation of the illustrated apparatus according to the invention is shown sequentially in FIGS. 1, 3, 4 and 5 of the drawing.

In FIG. 1, a stuffing operation is shown in the initial stage wherein a casing 2 is disposed on stuffing horn 4 with its fore end segment deshirred and closed by sealing clip 10. In this stage of the operation, product stoppering device 14 is fully advanced to the discharge end 6 of stuffing horn 4 thereby blocking the outlet opening 22 in said stuffing horn 4. The carriage cylinder (not shown) is then actuated to fully retract carriage assembly 38 thereby positioning ring 28 in mating spaced relationship with collar 34 to define truncated passage 36, and positioning flowback seal annulus 40 upstream about stuffing horn 4 as shown in FIG. 3. Next the product stoppering device 14 is retracted so as to allow the pressurized product to flow into casing 2. As casing 2 is being filled, it is supported on a trough (not shown). As the stuffed casing advances under the product stuffing flow pressure, the supply of shirred casing 2 is placed under tension as it passes through the conical passage 36, said tension being adjustable by varying the axial position of ring 28 with respect to collar 34. As the casing is advanced under the product stuffing flow pressure, flowback restraining seal 40 prevents the product from backing up on the outside of the stuffing horn 4. As stated above, by positioning the flowback restraining seal 40 upstream about the discharge end 6 of the stuffing horn 4, pocket 42 is created which effectively caused a turbulence in the discharge meat emulsion flow thereby effectively mixing any fat carried through aperture 22 into the meat emulsion. This mixing effectively eliminates the streaks of fat adhering to the interior of the casing wall thus yielding a stuffed casing having a more uniform appearance.

Referring to FIG. 4, when the casing is filled to a predetermined length, the product stoppering device 14 is advanced so as to stop the flow of the product. Specifically, as the fore end of the plunger 18 advances through discharge opening 22, the flow of product is completely terminated and as the fore end further advances through and projects out from the surface 24 defining opening 22, the product is completely severed at said opening 22 thereby eliminating any strands thereat, and the trailing end of the product is compacted within the casing by the cylindrical segment 20 for a distance "X". As shown in FIG. 5, when the carriage assembly 38 is retracted to a clip closure and severing station, the stuffed product 56 is also moved since it is supported on the carriage assembly 38. It is necessary that the carriage assembly 38 be retracted only after the plunger 18 becomes fully seated within and projected outward from the discharge opening 22 so as to insure that no strands of the product will be dragged along the inside of the casing and become trapped within the clip-closure zone. It is also possible to have the carriage assembly 38 stationary and have the stuffing horn assembly retracted since regardless which assembly is moved, the important fact is that there be a relative motion between them so as to position the stuffed casing 56 at the clip closure and severing station as shown in FIG. 5.

As shown in FIGS. 4 and 5, the plunger 18 is designed to be extended from the discharge aperture 22 so as to be in a position for compacting the trailing end of the stuffed product into a cup-like form 57 which serves to prevent the product from collapsing and dropping or tumbling into the clip-closure zone of the casing.

As shown in FIG. 5, when the casing is filled to a predetermined length and the product stoppering device 14 is advanced so as to completely stop the flow of the product, a conventional pneumatic cylinder (not shown) advances the carriage assembly 38 away from the end of the stuffing horn 4 to a clip closure station. At this position, the casing closure means is energized via suitable pneumatic cylinder means (not shown) whereupon gathering mating plates of devices 44-44' and 46-46'; and a conventional metal clip applicator means are advanced to gather, neck down the casing and apply a first or aft end clip closure 58 at the trailing end of the stuffed casing 56 and a second or fore end clip closure 60 to the fore end of the succeeding length of casing.

When the aft and fore end clip closure operation has been completed, a gathering shoe cylinder (not shown) is energized thereby advancing the attached gathering shoe 52 to the center line of the stuffing apparatus. Knife cylinder 54 is energized thereby advancing the attached knife 48 toward slot 50 in gathering shoe 52. With the full extension of the cylinders, the gathered casing is severed approximately midway the aft end closure 58 and fore end closure 60. After the casing has been severed, the casing closure means is deenergized to retract the mating gathering plates of devices 44-44', 46-46'; and the gathering shoe 52 and knife 48 are then retracted leaving the stuffing casing package in an unrestricted state where it can be removed by any suitable means as by rotating the stuffed casing supporting table about a conventional journal. Carriage assembly 38 is thereupon retracted to the site shown in FIG. 3 thus positioning the stuffing apparatus at the starting station where it is ready to repeat the stuffing cycle.

Figure 6:
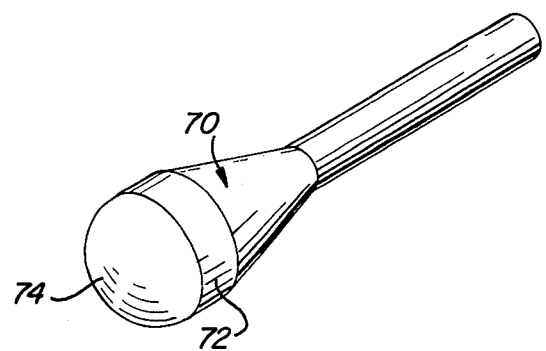
FIGS. 6 through 9 are perspective views of alternate plunger embodiments for use as the stoppering means in the apparatus of this invention.

FIGS. 6 through 9 show alternate embodiments of plungers for use as the stoppering means in this invention. Specifically, FIG. 6 shows a plunger 70 having a cylindrical circumferential contour 72 designed for seating within a discharge opening in a stuffing horn and terminating in a hemispherical configuration 74 which is designed for projecting beyond the surface defining said discharge opening.

Figure 7:
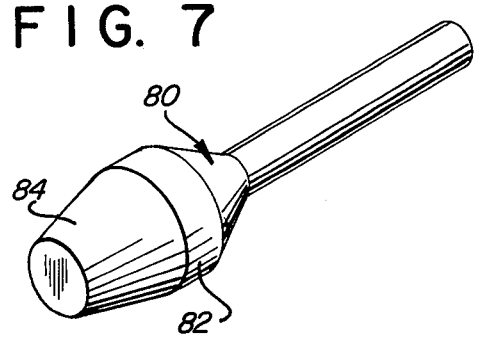

FIG. 7 shows a plunger 80 having a cylindrical circumferential contour 82 designed for seating within a discharge opening in a stuffing horn and terminating in a truncated configuration 84 which is designed for projecting beyond the surface defining said discharge opening.

Figure 8:
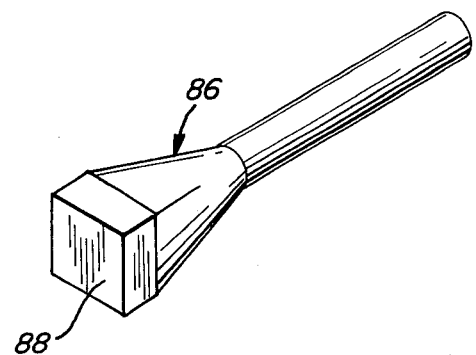

FIG. 8 shows a plunger 86 having a square circumferential contour 88 designed for seating within and projecting beyond the discharge opening at the discharge end of a stuffing horn.

Figure 9:
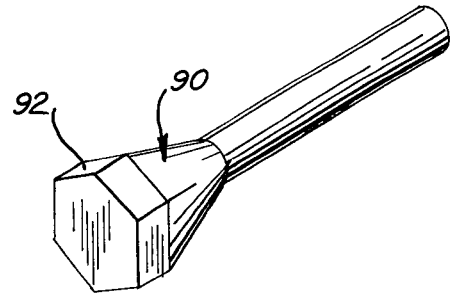

FIG. 9 shows a plunger 90 having a hexagonal circumferential contour 92 designed for seating within and projecting beyond the discharge opening at the discharge end of a stuffing horn.

Alternative embodiments and modes of practicing the invention, but within its spirit and scope, will, in the light of this disclosure, occur to persons conversant with the stuffing art. It is intended, therefore, that this description be taken as illustrative only and not construed in any limiting sense.

What is claimed is:
1. An apparatus for stuffing flowable viscous product into a casing which comprises:
   a. a stuffing horn having an inlet end for receiving flowable viscous product from a pressurized product supply and a discharge end for discharging the product, said stuffing horn being adaptable for concentrically receiving a casing;
   b. constraining means positioned about said stuffing horn for maintaining tension on the casing as it is being stuffed with a pressurized flowable viscous product; and
   c. product stoppering means disposed interiorly of the stuffing horn and adapted to cooperate with the stuffing horn so as to be effectively reciprocated between a first site where the stoppering means is disposed within the stuffing horn and in which a product stuffing flow can proceed through the stuffing horn and out through the discharge end of said horn, and a second site in which the product stuffing flow would be stoppered at the discharge end of the stuffing horn by said product stoppering means, said product stoppering means comprising a plunger adapted to seat within and project sufficiently outward from the discharge end of the stuffing horn when said stoppering means is disposed at the second site so as to effectively sever and compact a product in the trailing end of a stuffed casing thereby effectively providing the trailing end of a stuffed casing adjacent the stuffed compacted product with a product-free closure zone.

2. The apparatus of claim 1 wherein said plunger is adapted to project outward from the discharge end of the stuffing horn by a distance between about ⅛ inch (0.32 cm) and about 2¼ inches (5.72 cm).

3. The apparatus of claim 1 wherein said plunger is adapted to project outward from the discharge end of the stuffing horn by a distance between about ¼ inch (0.64 cm) and about 1 inch (2.54 cm).

4. The apparatus of claim 1 wherein said plunger is adapted to project outward from the discharge end of the stuffing horn by a distance between about 1/24 and about ¾ the diameter of the stuffing horn.

5. The apparatus of claim 1 wherein said plunger is adapted to project outward from the discharge end of the stuffing horn by a distance between about 1/12 and about ⅓ the diameter of the stuffing horn.

6. The apparatus of claim 1 wherein a circular opening is disposed at the discharge end of said stuffing horn and wherein the plunger terminates in a generally cylindrical extension which is adapted for seating within and projecting beyond the surface defining said circular opening at the discharge end of said stuffing horn when the stoppering means is disposed at the second site.

7. The apparatus of claim 1 wherein a circular opening is disposed at the discharge end of said stuffing horn and wherein the plunger comprises a generally cylindrical segment terminating in a generally hemispherical configuration with said cylindrical segment being adapted for seating within said circular opening and said hemispherical configuration being adapted for projecting beyond the surface defining said circular opening at the discharge end of said stuffing horn when the stoppering means is disposed at the second site.

8. The apparatus of claim 1 wherein a circular opening is disposed at the discharge end of said stuffing horn and wherein the plunger comprises a generally cylindrical segment terminating in a generally truncated configuration with said cylindrical segment being adapted for seating within said circular opening and said truncated configuration being adapted for projecting beyond the surface defining said circular opening at the discharge end of said stuffing horn when the stoppering means is disposed at the second site.

9. The apparatus of claim 1 wherein a square opening is disposed at the discharge end of said stuffing horn and wherein the plunger terminates in a generally square extension which is adapted for seating within and projecting beyond the surface defining said square opening at the discharge end of said stuffing horn when the stoppering means is disposed at the second site.

10. The apparatus of claim 1 wherein a hexagonal opening is disposed at the discharge end of said stuffing horn and wherein the plunger terminates in a generally hexagonal extension which is adapted for seating within and projecting beyond the surface defining said hexagonal opening at the discharge end of said stuffing horn when the stoppering means is disposed at the second site.

11. The apparatus of claim 1 wherein a product flowback seal means is added which comprises an annulus adapted to be removably centrally aligned upstream about the discharge end of said stuffing horn, said annulus having an inner diameter larger than the outer diameter of the discharge end of the stuffing horn so as to define a circumferential passage between the annulus and upstream about the discharge end of the stuffing horn through which the casing being stuffed can be passed in slipping contact against the stuffing horn thereby effectively preventing flowback of the pressurized flowable product exiting from the horn discharge end while simultaneously causing a turbulence in the product flow at the exit of the horn discharge end thereby effectively intermixing the product thereat; and means for intermittently reciprocating the annulus between a first site concentrically about the stuffing horn and upstream from the horn discharge end and a second site away from the horn discharge end.

12. The apparatus of claim 11 wherein a circular opening is disposed at the discharge end of said stuffing horn and wherein the plunger comprises a generally cylindrical segment terminating in a generally hemispherical configuration with said cylindrical segment being adapted for seating within said circular opening and said hemispherical configuration being adapted for projecting beyond the surface defining said circular opening at the discharge end of said stuffing horn when the stoppering means is disposed at the second site.

13. A method for stuffing a casing with product to produce stuffed casings with product-free closure zones which comprises:
 a. sheathing a casing onto a stuffing horn, said horn having an inlet end and a discharge end, and the fore end of the casing proximal the discharge end of the horn being closed;
 b. supplying a pressurized flowable viscous product at the inlet end of the stuffing horn and releasing said product from the discharge end of said stuffing horn to progressively stuff the casing;
 c. stopping the flow of pressurized product after a predetermined length of casing has been stuffed;
 d. compacting the product at the trailing end of the casing to produce a recess therein and severing the product at the discharge end of the stuffing horn;
 e. advancing the casing over the discharge end of said stuffing horn so as to provide a product-free closure zone in the casing trailing the end of the stuffed product; and
 f. applying a closure at the product-free closure zone of said casing at the aft end of the stuffed product.

14. A method for stuffing a casing with product to produce stuffed casings with product-free closure zones which comprises:
 a. sheathing a casing onto a stuffing horn, said horn having an inlet end and a discharge end, and the fore end of the casing proximal the discharge end of the horn being closed;
 b. supplying a pressurized flowable viscous product at the inlet end of the stuffing horn and releasing said product from the discharge end of said stuffing horn to progressively stuff the casing;
 c. stopping the flow of pressurized product after a predetermined length of casing has been stuffed;
 d. compacting the product at the trailing end of the casing to produce a recess therein and severing the product at the discharge end of the stuffing horn;
 e. advancing the casing over the discharge end of said stuffing horn so as to provide a product-free closure zone in the casing trailing the end of the stuffed product;
 f. applying within the product-free closure zone of said casing a closure at the aft end of the stuffed product and a closure at the fore end of the succeeding trailing unfilled casing;
 g. severing said stuffed closed end casing intermediate said aft end closure and said fore end closure of the succeeding trailing unfilled casing; and
 h. repeating the supplying step (b), the stopping step (c) the compacting and severing step (d), the advancing step (e), the closure step (f), and the severing step (g) until the casing is completely expended.

* * * * *